United States Patent Office 3,422,154
Patented Jan. 14, 1969

3,422,154
PROCESS FOR PRODUCING DINITRO-
DIPHENYL ETHERS
Joseph Francis Laucius, Wilmington, Del., and Louis
Spiegler, Woodbury, N.J., assignors to E. I. du
Pont de Nemours and Company, Wilmington, Del.,
a corporation of Delaware
No Drawing. Continuation of applications Ser. No.
224,499, and Ser. No. 224,501, Sept. 18, 1962. This
application June 16, 1966, Ser. No. 557,920
U.S. Cl. 260—612                        6 Claims
Int. Cl. C07c 41/04

ABSTRACT OF THE DISCLOSURE

Process for producing dinitrodiphenyl ethers which comprises reacting certain halogeno-mononitrobenzenes and alkali-metal nitrophenolates in the presence of a selected organic sulfone medium at a temperature of 150°–250° C.

---

This application is a continuation of applications Ser. No. 224,499 and Ser. No. 224,501, both filed Sept. 18, 1962 and both now abandoned.

This invention is directed to a process for producing dinitrodiphenyl ethers.

It is an object of this invention to provide a technically significant and economically practical process for producing dinitrodiphenyl ethers in high yield and in a high state of purity. A further object is to provide a novel process for producing said compounds which process may be operated on a continuous basis. A still further object is to provide a process which does not utilize solid catalytic material and hence is free of catalyst residue and removal problems. A further object is to provide a process wherein the hydrolysis of the solvent is minimized, thereby resulting in the economic advantage of permitting recovery and re-use of the solvent. Other objects and achievements of this invention will become apparent as the description proceeds.

In the statements above and in the description which follows, the expressions dinitrodiphenyl ethers and di-aminodiphenyl ethers are meant to include the simple compounds as well as compounds bearing further nuclear substitutents other than hydroxy, acidic and basic radicals.

Dinitrodiphenyl ethers are intermediates for the production of the corresponding diamino compounds.

Diaminodiphenyl ethers, particularly, p,p'-diaminophenyl ether which is known in the trade as p,p'-oxydianiline, are valuable as bifunctional crosslinking and network-extending agents for various polymers which serve as resins, plastics and elastomers, or as intermediates for diisocyanates. Heretofore, p,p'-oxydianiline has been manufactured by laborious and costly processes, for instance by brominating diphenyl ether to the dibromo stage and then reacting upon this compound with ammonia in the presence of a copper catalyst. This process is not only costly, because of the relatively high cost of bromine, but is also likely to produce various isomers in the bromination step, which either make the principal product impure or require costly separation procedures.

In the case of triamino diphenyl ether, the requisite intermediate trinitrodiphenyl ether can be readily prepared by condensing 2,4-dinitro-chlorobenzene with an alkali-metal nitrophenolate in a convenient solvent such as aqueous dioxane. Attempts, however, to condense mono-nitro chlorobenzenes (e.g. p-chloronitrobenzene) with an alkali-metal nitrophenolate by a similar procedure have hitherto lead to disappointing results. Condensation, if any, takes place to a very low yield, and separation of the product from by-products and impurities constitutes a very different task. Six per cent and 45% yields, under very specialized and costly conditions, have been common experiences in the art. The conclusion was reached by Raiford and Colbert in 1926 (J.A.C.S., 48 26 52–62) that in a reaction of this nature, "when the phenol contains a nitro radical, the reaction will fail unless the halogenated benzene contains more than one nitro group."

We have now made the surprising discovery that the reaction of a mononitrochlorobenzene with an alkali metal nitrophenolate can be made to proceed smoothly, with the highest yields and with high-quality product if the reaction is carried out in an organic sulfone of the group consisting of aliphatic sulfones of the formula R—SO$_2$—R' wherein R and R' are alkyl radicals of 1 to 4 C-atoms and cyclic sulfones of the formula

wherein R" is a saturated aliphatic hydrocarbon radical of 4 to 6 C-atoms of which 4 C-atoms form a 5-membered ring with the SO$_2$ group.

As convenient examples of solvents falling within the above definition may be named: dimethyl sulfone, diethyl sulfone, di-n-propyl sulfone, di-n-butyl sulfone,

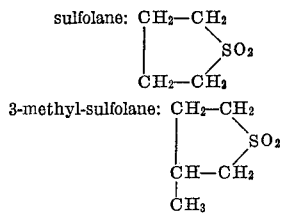

and

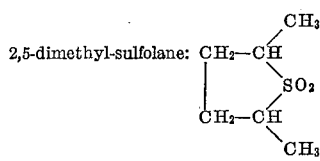

The specific compounds hereinabove named are all water-soluble liquids, water-miscible liquids or low melting solids and have high boiling points, e.g. 285° C. for sulfolane.

According to the preferred mode of our invention, the condensation of the chloronitrobenzene with the alkali-metal nitrophenolate is carried out at about the highest temperature that is practical with the solvent selected. Under atmospheric conditions this may correspond to the reflux temperature of the mass. Preferably the reaction is carried out at 150°–250° C. Near the lower temperature limit above indicated, a reaction period of five to six hours may be required, whereas at temperatures above 200° C. it becomes complete in less than 15 minutes.

Contrary to the efforts reported in the literature by some investigators heretofore, the condensation reaction in our invention requires no copper catalysts and no excess of either component; accordingly, it is preferably carried out with essentially equimolecular proportions of reactants and without any catalysts whatever. Nevertheless, if desired, an excess of either reactant may be employed, since the excess of the chloronitrobenzene can be removed by a steam distillation, while excess nitrophenolate will be eliminated in the aqueous filtrate during recovery.

The condensation reaction may be exemplified by the following equation:

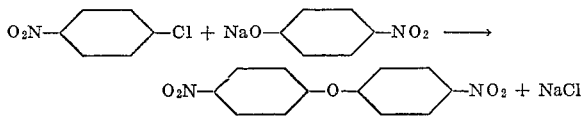

But instead of the above two simple initial reactants, any substitution derivative of either reactant may be employed provided it is free of ionic or salt forming radicals such as OH, COOH, SO₃H or NH₂ (not counting, of course, the first NaO group shown in the above formula of the nitrophenolate). Stated in different words, the initial halogenonitrobenzene may be a compound of the formula

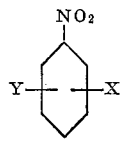

wherein X stands for a halogen such as Cl or Br and is located in a position ortho or para to the NO₂ group and Y is hydrogen, lower alkyl or alkoxy or it may be a second halogen atom provided the latter is located meta to the NO₂ group. The nitrophenolate, on the other hand, may be a compound of the formula

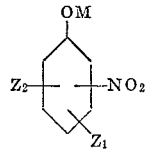

wherein M is an alkali metal such as sodium or potassium, while Z₁ and Z₂ represent members of the group consisting of hydrogen, lower alkyl, lower alkoxy and halogen which is oriented meta with respect to the NO₂ group.

The above limitations on the positions of any halogen in the molecule other than X is based on my observation that only ortho- and para-oriented halogen reacts with the OM group to form an ether; therefore, to avoid formation of isomers and by-products, any halogen in either molecule, other than X in the first formula, should best be located in meta position to the NO₂, whereby it is essentially non-reactive under the reaction conditions of this invention.

As specific illustrations of practical initial reactants that may be chosen for the improved process of my invention may be mentioned:

A. (Halogenonitrobenzenes).—o - Chloronitrobenzene, p-chloronitrobenzene, 2,5- 2,3- and 3,4-dichloronitrobenzene, 4-chloro-3-nitrotoluene, and o- or p-chloronitrobenzenes containing a methyl group in any other position, 2-chloro-5-ethylnitrobenzene, 4-chloro-2,5-dimethyl nitrobenzene, 5-chloro-2-nitroanisol and 4-chloro-3-nitrophenetol. The corresponding bromonitrobenzenes are also operative but are naturally more expensive.

B. (Alkali - metal nitrophenolates).—The sodium or potassium salt of any of the following phenols: o-, m- or p-nitrophenol, 4-methyl-3-nitrophenol, 2-methyl-5-nitrophenol, 4-chloro-2-nitrophenol, 2,6-dichloro - 4 - nitrophenol, the corresponding bromo or dibromo-nitrophenols, 4-ethyl-3-nitrophenol, 2-ethyl-5-nitrophenol, 2-nitro-6-methoxyphenol, 2-nitro-3-hydroxy - 5 - methoxytoluene, 2,5-dimethyl-4-nitrophenol, 4,5-dimethyl-2-nitrophenol, 4-ethyl-2-nitrophenol, a mixture of 2-ethyl-4-nitrophenol and 2-ethyl-6-nitrophenol, and in general any nitrophenol containing one or more lower alkyl or alkoxy radicals (1 to 4 C-atoms) in any position or containing Cl or Br in position meta to the NO₂ group.

The alkali-metal in the above compounds may be sodium or potassium. Lithium is also suitable, but more expensive.

Many of the aforementioned alkali-metal phenolates are prepared by hydrolyzing with strong alkali the corresponding chlorine derivatives. A further advantage of this invention is that instead of employing a dry nitrophenolate, one may start with an aqueous press cake of the same. In such event, the reaction mixture containing the solvent, nitrophenolate and halogenonitrobenzene is first dehydrated by distilling off the water, and is then heated to the desired higher temperature, to complete the condensation.

Moreover, instead of starting with a nitrophenolate, the nitrophenol may be used in the form of the free hydroxy compound. In this case, stoichoimetric amounts of sodium or potassium hydroxy or an excess of an alkali metal carbonate is added to the reaction mass prior to the dehydration distillation, to form the alkali-metal phenolate in situ. Other conventional acid binders, including sodium or potassium bicarbonates or disodium phosphate, may be employed in place of the alkali carbonate.

The amount of solvent to be employed is not critical; it should be sufficient to produce a stirrable suspension at the condensation temperature, bearing in mind the formation of solid alkali-metal halide in the course of the reaction. As a rule, a quantity of the solvent equal in weight to the sum of the initial reactants, will suffice. Quantities twice or three times this amount may be employed, but higher quantities are simply wasteful. A convenient rule is to use a quantity of solvent equal in weight to from 1.5 to 2.5 times the weight of the halogenonitrobenzene started with.

Isolation of the dinitrodiphenyl ether may be achieved in any convenient manner, for instance by diluting the reaction mass with sufficient water to dissolve the by-product alkali-metal salt, and filtering off the precipitated dinitro-ether. The solvent may be recovered for re-use in additional condensations in a batch process, or it may be recycled into the reaction vessel, if the process is of a continuous nature.

More specifically, the present invention is directed to a process for the preparation of a dinitrodiphenyl ether comprising reacting, at 150° to 250° C., an o- or p-chloro- or bromonitrobenzene with an alkali metal salt of a nitrophenol in the presence of a sulfone selected from the group consisting of a dialkyl sulfone of the formula R—SO₂R, where R is an alkyl of 1 to 4 carbon atoms and a cyclic sulfone of the formula

where R″ is a saturated aliphatic hydrocarbon radical of 4 to 6 C-atoms of which 4 C-atoms form a 5-membered ring with the SO₂ group.

Examples of suitable sulfones are: dimethyl sulfone, diethyl sulfone, di-n-propyl sulfone, di-n-butyl sulfone, sulfolane, 3-methylsulfolane and 2,5-dimethylsulfolane.

Without limiting this invention, the following representative examples are given to illustrate our preferred mode of operation. Parts mentioned are by weight.

EXAMPLE I

A mixture of 28.5 parts of dry p-nitrophenol sodium salt, 27 parts of p-nitrochlorobenzene and 90 parts of dimethylsulfone were heated at 200° C. for eight hours.

The reaction mass was then cooled to 150° C. and diluted slowly with 500 parts of water. The mixture was then cooled to room temperature and filtered. The crude product was suspended in 200 parts of water at 85° to 90° C. and filtered hot to remove trace amounts of p-nitrophenol sodium salt in the filtrate.

The yield was 38 parts of 4,4-dinitrodiphenyl ether, melting range 141–141.8° C.

EXAMPLE II 40.5 parts of dry p-nitrophenol sodium salt, 39.5 parts of p-nitrochlorobenzene and 132 parts of n-butylsulfone were heated at 200° C. for ten hours. The reaction mass was diluted with 500 parts of water and steam distilled at constant volume to remove trace amounts of unreacted p-nitrochlorobenzene. About five to six parts of n-butylsulfone are also distilled out. The residue in the still was cooled at 15° to 20° C. and stirred for one to two hours to precipitate a mixture of the n-butylsulfone and dinitrodiphenyl ether.

Extraction of this mixture with 440 parts of benzene yielded 23.4 parts of 4,4-dinitrodiphenyl ether, M.P. 144.5–145° C.; and a benzene solution of n-butylsulfone (585 parts) containing 31.6 parts of the dinitrodiphenyl ether.

After recovery of benzene by distillation, the residual mixture of n-butylsulfone and dinitrodiphenyl ether can be used (recycled) for the condensation of more p-nitrophenol sodium salt and p-nitrochlorobenzene.

EXAMPLE III

A mixture of 43.5 parts of oven-dried p-nitrophenol sodium salt, 39.5 parts of p-chloronitrobenzene and 132 parts of sulfolane was refluxed for two hours at 200° C. The reaction mass was diluted with 500 parts of water which was added dropwise, stirred for one hour at room temperature and filtered. The precipitate was washed with hot water, filtered hot and air dried at 95°. Yield of 4,4'-di-nitro-diphenyl ether was 50.8 parts, M.P. 142.9–143.4° C.

EXAMPLE IV

Fifty-eight parts of p-nitrophenol sodium salt were added to 132 parts of sulfolane. The mixture was stirred and heated to 185° C., allowing water to distill out overhead. 39.5 parts of p-nitrochlorobenzene were added; after which the reaction mass was maintained at 185° for three hours. The reaction mass was diluted with 150 parts of water and steam distilled at constant volume to remove unreacted p-nitrochlorobenzene (two parts). The charge was cooled to room temperature and filtered. The 4,4'-dinitrodiphenyl ether was washed on the filter with 3–30 part portions of benzene. The combined aqueous sulfolane filtrate and benzene washes were saved for reuse. The 4,4'-dinitrodiphenyl ether (63 parts wet; 53 parts air dried solids) was slurried at 85–90° in 400 parts of water, and filtered hot. The aqueous filtrate was discarded. Weight of wet cake was 61.6 parts, dry weight was 56 parts, M.P. 143.1–143.6° C.

The following table lists additional representative solvents applicable in the invention, and the yields of 4,4'-dinitrodiphenyl ether obtained in the respective reaction medium.

clusive property or privilege is claimed are defined as follows:

1. A process for producing a dinitrodiphenyl ether which comprises reacting a halogeno-mononitrobenzene of the formula

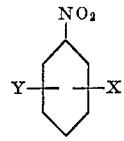

with an alkali-metal nitrophenolate of the formula

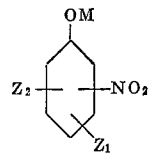

wherein M is an alkali metal, X is a halogen of the group consisting of Cl and Br located in a position other than meta to the $NO_2$ group, Y, $Z_1$ and $Z_2$ are members of the group consisting of hydrogen, alkyl, alkoxy and meta oriented halogen, said alkyls being radicals of 1 to 4 carbon atoms, and said orientation being taken with respect to the $NO_2$ group; the reaction being effected by heating said reactants at a temperature between 150° to 250° C. in an organic sulfone solvent selected from the group consisting of aliphatic sulfones of the formula R—$SO_2$—R' where R and R' are alkyl radicals of 1 to 4 carbon atoms and water-miscible cyclic sulfones of the formula

where R" is a saturated aliphatic hydrocarbon radical of 4 to 6 carbon atoms of which 4 carbon atoms form a 5-membered ring with the $SO_2$ group, said solvent being present in at least an amount sufficient to produce a stirrable suspension at the reaction temperature.

2. A process as in claim 1 including further the step of recovering the dinitrodiphenyl ether in substance, by drowning the reaction mass in water and recovering the precipitated solid.

3. A process as in claim 1, the solvent being dimethyl sulfone.

4. A process as in claim 1, the solvent being di-n-butyl sulfone.

5. A process as in claim 1, the solvent being sulfolane.

6. A process as in claim 1, the solvent being 2,5-dimethylsulfolane.

| Solvent | Reaction cond. | | 4,4'-dinitrodiphenyl ether | | |
|---|---|---|---|---|---|
| | Temp., ° C. | Time, hour | M.P., ° C. | Yield, percent isolated [1] | Total analyzed |
| Sulfolane | 200 | 2 | 142.9–143.4 | 85 | 90+ |
| 2,5-dimethylsulfolane | 200 | 4 | 143.8–144.6 | [2] 58 | 90 |

[1] Isolated by drowning in water unless otherwise indicated.
[2] Crystallized from condensation mass.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an ex-

References Cited

UNITED STATES PATENTS 2,365,898  12/1944  Morris et al.
3,032,594  5/1962   Towle _____ 260—612
3,192,263  6/1965   Spiegler _____ 260—612 XR BERNARD HELFIN, *Primary Examiner.*

U.S. Cl. X.R.

260—613